United States Patent [19]
Warren

[11] 3,929,234
[45] Dec. 30, 1975

[54] ARTICLE TRANSFER AND SPACER MEANS

[75] Inventor: William H. Warren, Omaha, Nebr.

[73] Assignee: Henningsen Foods, Inc., White Plains, N.Y.

[22] Filed: Dec. 23, 1974

[21] Appl. No.: 536,023

[52] U.S. Cl. .................. 214/1 BV; 53/247; 198/34; 214/309
[51] Int. Cl.² ......................................... B65G 47/26
[58] Field of Search .............. 214/1 BV, 309, 8.5 C; 294/87 A; 53/247; 198/34

[56] References Cited
UNITED STATES PATENTS

| | | | |
|---|---|---|---|
| 3,506,140 | 4/1970 | Koch | 214/309 X |
| 3,805,943 | 4/1974 | Warren | 214/1 BV X |

*Primary Examiner*—Robert J. Spar
*Assistant Examiner*—George F. Abraham
*Attorney, Agent, or Firm*—Holland, Armstrong, Wilkie & Previto

[57] ABSTRACT

An improved spacer device is described for use on an article transfer means such as one which carries eggs from storage cartons where the eggs have one array or spacing to an egg conveyor having another array. The device of the invention has a number of movably mounted egg lifter plates carried by lifter arms. The spacing of the lifter plates is adjusted during the transfer in a manner to change the spacing of the transferred eggs from the carton spacing to the conveyor spacing. The means for adjusting the plate spacing includes a cam member coupled through sliding and pivotal members to the several plates so that the desired plate movement results from the transfer motion of the lifter arms as the eggs are carried on the plates from the egg pick-up position to the egg placing position.

12 Claims, 6 Drawing Figures

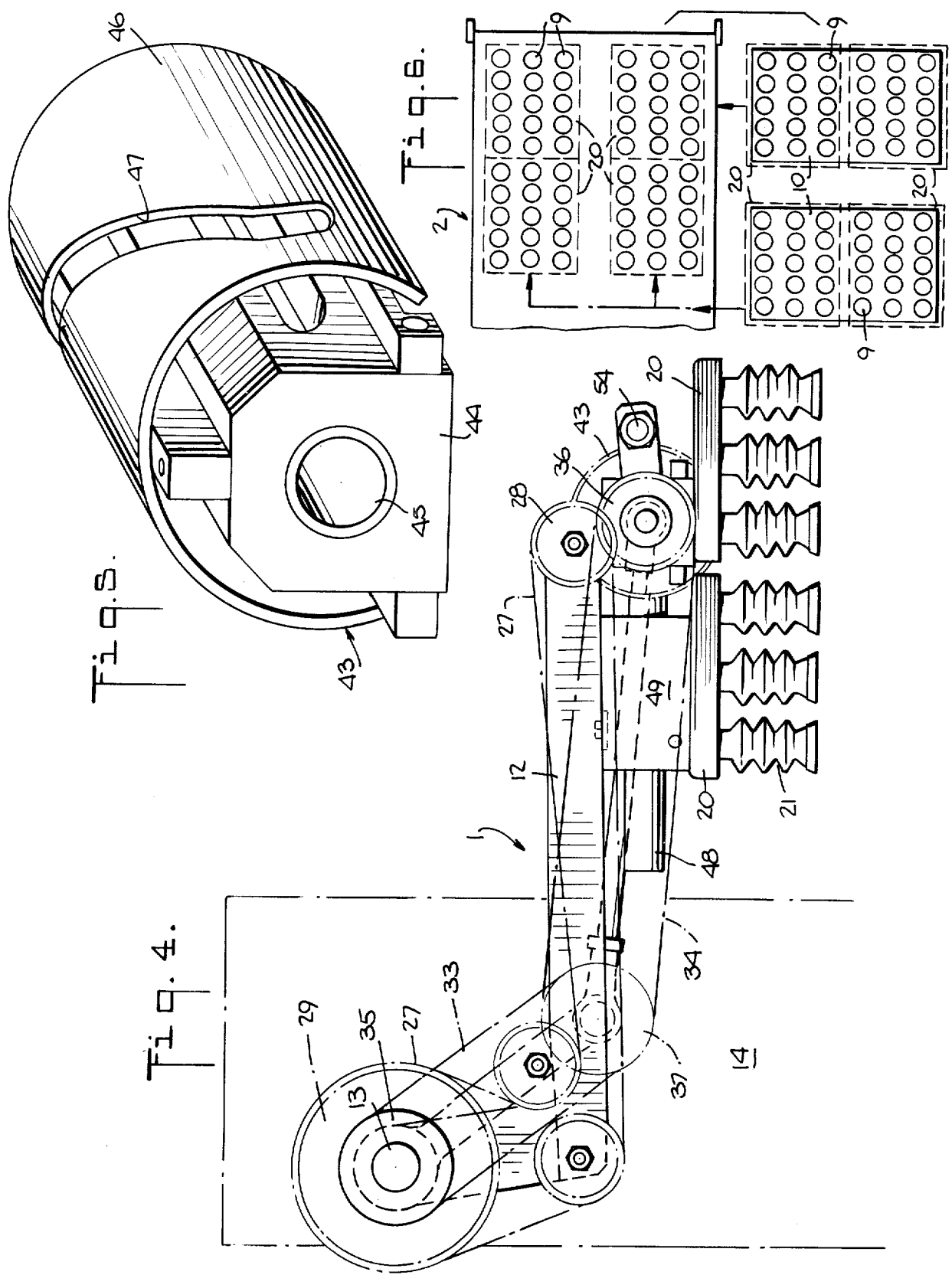

ARTICLE TRANSFER AND SPACER MEANS

BACKGROUND OF THE INVENTION

The present invention relates to article transfer means for performing a transfer operation such as moving eggs from trays to a conveyor or a similar article transfer operation. More particularly, the present invention relates to improved means for altering the spacing of an array of articles during the transfer operation as, for example, a means for rearranging the spacing of an array of eggs during their transfer from egg trays to an egg conveyor.

The improved spacer means is particularly useful for high capacity automatic egg transfer machinery such as is used in high volume egg processing operations where large numbers of eggs are continuously transferred from trays to conveyors, etc. In order to provide for an efficient transfer operation of this type in a high volume egg processing operation, it is desirable to have a plurality of egg trays simultaneously emptied by the transfer apparatus at the pick-up position. Because of the conventional egg carton design, this results in an egg spacing at the pick-up point which differs from that required at a conventional conveyor. The egg conveyors onto which the eggs are unloaded, for example, have egg supporting members which space the eggs both uniformly across the individual rows and between successive rows. The device for transferring eggs, for this reason, rearranges the egg spacing during the transfer with a spacing at the conveyor which accomodates the egg array to the conveyor egg spacing.

A number of prior article transfer devices have provided for some adjustment of the article spacing including a transfer device having a one-dimensional spacing adjustment as described in my U.S. Pat. No. 3,542,224 dated Nov. 24, 1970 and entitled TRANSFERRING ARTICLES FROM A CLOSE ARRANGEMENT TO A SPREAD FORMATION. The spacer means of the present invention is an improvement upon such prior spacers. It provides a more rugged and simplified structure which at the same time is efficient and precise in a twodimensional repositioning of the transferred articles. The improved spacing means is also adaptable for smooth operation at high operating rates which makes it particularly adaptable for handling relatively fragile articles such as shell eggs.

Accordingly, an object of the present invention is to provide an improved article transfer and spacer means.

Another object of the present invention is to provide a two-dimensional article transfer and spacer means adapted for smooth and precise operation at relatively high transfer speeds.

Another object of the present invention is to provide an improved article spacer means particularly adapted for use with a pivotally mounted multiple plate article transfer device.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings, forming a part of the specification, wherein:

FIG. 4 is a side elevational view illustrating the transfer means in its egg pick-up position.

FIG. 5 is an enlarged detailed perspective view of a preferred embodiment of a control cam for the spacer means.

FIG. 6 is a diagrammatic illustration of the article spacing before and after the spacing change during transfer.

DESCRIPTION OF THE PREFERRED EMBODIMENT

The spacer means of the invention is useful with a variety of articles, however, it has particular value for use with egg transfer systems and will be described in connection with an egg transfer device using pivotally mounted, vacuum operated, egg transfer plates.

Figure 1:
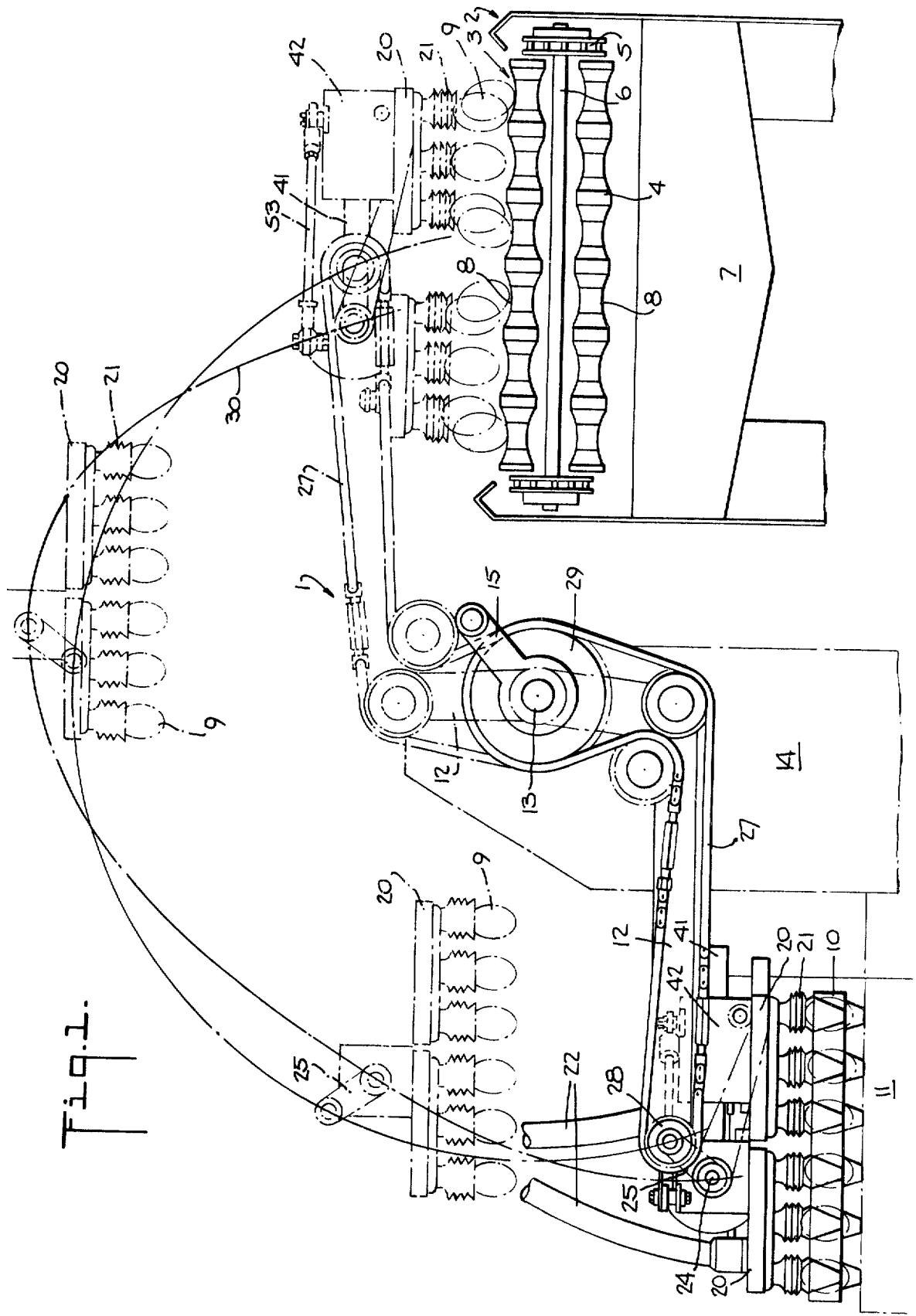
FIG. 1 is a side elevational view illustrating the spacer means incorporated in a pivotally mounted multiple plate egg transfer machine.

FIG. 1 illustrates the spacer means in an egg transfer device 1 which will now be briefly described to give a background for a more detailed description of the spacer means itself.

An egg conveyor 2 of the roller type is illustrated at the right side of FIG. 1 which includes a conventional roller conveyor belt 3 having rollers 4 on chains 5 mounted on end pulleys 6 on a support frame 7. The conveyor belt 3 includes a large number of the rollers 4 of the form illustrated having egg carrying pockets 8. The egg conveyor 2 carries eggs 9 to various egg processing devices including washing, inspecting, breaking, and other egg processing devices.

The egg transfer means 1 is illustrated at the left of the conveyor 2. It transfers eggs 9 from trays 10 on a pick-up table 11 to the conveyor 2. The egg transfer device 1 includes a pair of L-shaped lifter arms 12 pivotally mounted on opposite ends of a drive shaft 13 in the machine frame 14. The drive shaft 13 together with the attached lifter arms 12 are periodically turned to move the lifter arms 12 from their pick-up position, as illustrated at the left side of FIG. 1, to the egg placing position above the conveyor 2, as illustrated in dot-dash lines at the right side of FIG. 1. This movement of the lifter arms 12 is provided by a crank member attached to the drive shaft 13 and driven by a suitable drive means (not shown) and which does not constitute a portion of the present invention.

A plurality of egg lifter plates 20 are attached to the outer ends of the transrer arms, as will be described more fully below. Each of these lifter plates 20 has a hollow center manifold coupled to a number of resilient vacuum cups 21. The cups 21 are connected through the lifter plate 20 manifolds by suitable coupling hoses 22 to a source of vacuum so that an egg gripping vacuum force is present at each of the vacuum cups 21 during the transfer operation.

A change in the spacing or in the array of the transferred articles is accomplished by using a number of separate lifter plates for the transfer operation. The number and the arrangement of the plates is chosen to permit an efficient engagement with the articles at the pick-up position and for thereafter providing for a simultaneous transfer and respacing of the transferred articles. Where the articles are eggs which are being transferred from egg trays to an egg conveyor, in the preferred embodiment of the device being described herein, the plate arrangement is made to permit an efficient placement of the egg trays at the pick-up position and for the release of the transferred eggs onto an egg conveyor having conventional dimensions.

FIG. 6 illustrates diagrammatically a preferred embodiment using four lifter plates 20 for moving sixty shell eggs 9 from egg trays 10 to an egg conveyor 2. Two conventional egg trays 10 are illustrated each containing thirty eggs 9 in uniform arrays of six rows of five eggs each. At the pick-up position, the two trays 10 are preferably spaced apart an inch or so to facilitate tray placement and tray removal and, in any case, require respacing at the conveyor 2 to get the proper spacing between the end rows in adjacent trays 10. The eggs in the trays 10 are conventionally held in a vertical position with slightly less than two inches between egg rows and between eggs in each row. A preferred embodiment of the lifter plate arrangement provides two plates 20 for each tray 10 with a vacuum cup 21 provided on the plates 20 for each egg 9. Thus, fifteen vacuum cups 21 are provided on each lifter plate 20 with a spacing corresponding to that of the eggs, i.e., with their centers being slightly less than two inches apart. The two lifter plates 20 over each egg tray 10 are closely spaced at the pick-up position to provide the desired uniform vacuum cup 21 spacing for the six adjacent egg rows in the trays.

Sixty eggs 9 are transferred by the four lifter plates 20 to the conveyor 2 and are placed on the conveyor 2 with the conveyor egg spacing which differs from that of the egg tray spacing already described. This results from the fact that the eggs 9 are carried on the conveyor rollers in a horizontal position whereby additional spacing is needed between adjacent eggs in the egg rows. The spacing between the rollers 4 or rows of eggs 9 on the conveyor 2 is usually approximately two inches.

Figure 2:
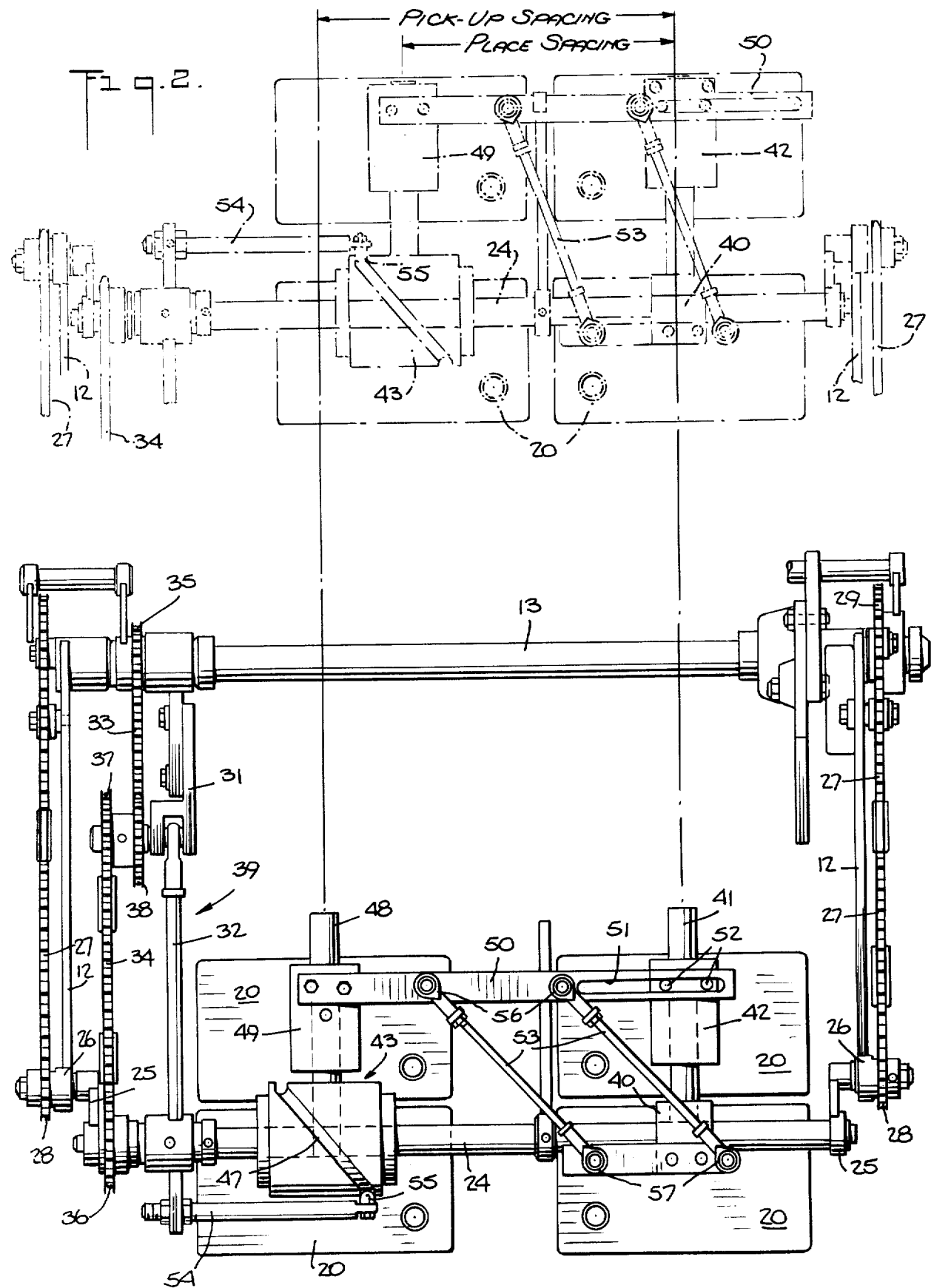
FIG. 2 is a top plan view of a preferred embodiment of the spacer means.

An adjustment of the lifter plate 20 spacing to obtain the above discussed egg spacing at the conveyor 2 is illustrated at the top of FIG. 6 as well as in FIGS. 1 and 2. A uniform spacing between ten rows of eggs 9 to match the roller 4 spacing is obtained by moving the lifter plates 20 so that their narrow edges are adjacent to one another and so that the ten rows of six cups 21 on the lifter plates are all then spaced about two inches apart. A simultaneous adjustment is made to increase the spacing between the longer edges of the lifter plates 20 to compensate for the wider spacing between the six eggs 9 in the individual rows. The longer edges of the lifter plates 20 are moved about two inches apart resulting in an egg spacing as illustrated at the right hand side on FIG. 1. This spacing places the center egg 9 directly above a corresponding pocket 8 in an egg roller 4 and leaves the adjacent eggs 9 on either side of the center egg slightly off center with respect to their corresponding pockets 8. The curved shape of the pockets 8, however, re-centers the outer eggs 9 as they slide into the pockets 8 when they are released by the lifter plates 20 so that they are uniformly spaced across the rollers 4 on the conveyor 2.

The above described spacing adjustments of the lifter plates 20 provide a two-dimensional spacing adjustment.

The mounting of the egg lifter plates 20 on the two lifter arms 12 and the related and cooperating spacer means which performs the spacing operation described above will now be described in greater detail.

A lifter plate suspension shaft 24 has it opposite ends attached to the two lifter arms 12 by short orbit arms 25. The orbit arms 25 rotatably mount the suspension shaft 24 at their outer ends and are pivotally mounted at their opposite ends on the lifter arms 12 by suitable bearings 26. The orbit arms 25 are each operatively connected by an endless chain 27 and a sprocket 28 on the link ends to a stationary sprocket 29 attached to the transfer device frame 14. This orbit arm arrangement alters the path of movement 30 (FIG. 1) of the suspension shaft 24 between the egg pick-up and the egg placing positions as the orbit arms 25 are turned by the chain 27 but forms no part of the present invention.

The egg lifter plates 20 are continuously held in a position parallel to the conveyor and to the egg tray surfaces by a standard pantograph 39 including a pair of pantograph arms 31 and 32 and chains 33 and 34 coupling a fixed sprocket 35 on the drive shaft 13 to a sprocket 36 on the rotatably mounted suspension shaft 24 through connected sprockets 37 and 38. The pantograph 39, by keeping the lifter plates 20 parallel to the conveyor 2 surface, caused a rotation of the suspension shaft 24 with respect to the lifter arms 12 and the orbit arms 25.

Figure 3:
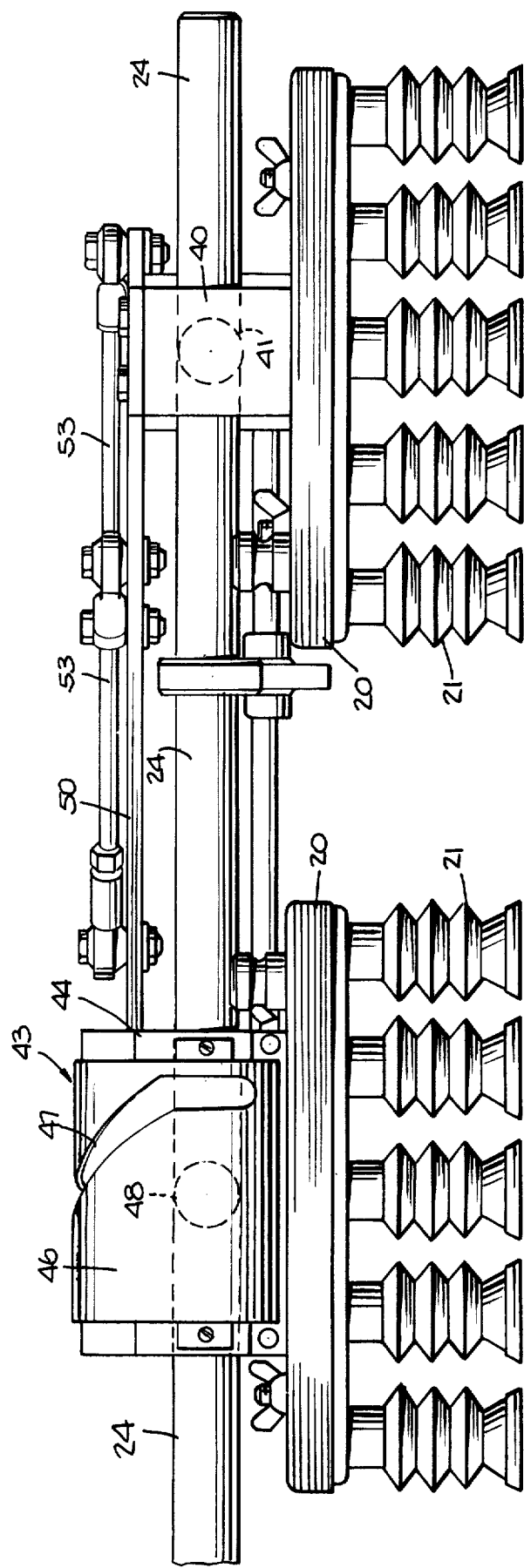
FIG. 3 is an enlarged detailed front elevational view of the egg support plates and the plate spacer means.

As best illustrated in FIGS. 2 and 3, one of the four egg lifter plates 20 is fixedly connected to the suspension shaft 24 by means of a suspension block 40. A second lifter plate 20 is attached to the block 40 by means of a slide shaft 41 which slidably engages a bearing 42 on the second lifter plate 20. The other front lifter plate 20 is attached to the suspension shaft 24 by a cam 43. The cam 43 includes a central support member 44 (FIG. 5) including an aperture 45 for slidably engaging the suspension shaft 24. A barrel cam plate 46 is attached on the outer portion of the support member 44 and includes a curved cam slot 47. A cam follower 54 has one end attached to the outer end of the pantograph arm 32 and has its other end 55 engaged in the cam slot 47. The fourth lifter plate 20 is slidably mounted on the cam 43 on a slide shaft 48 by a suspension block 49. A spread plate 50 connects the two rear lifter plates 20 by being bolted at one end to the suspension block 49 and by being slidably coupled to the other rear lifter plate 20 by means of a slot 51 and slot engaging pins 52. A pair of links 53 of equal length are pivotally attached at their opposite ends by equally spaced pivots 56 and 57 on the spread plate 50 and on the suspension block 40.

During the egg transfer the lifter arms 12 swing through their transfer motion of approximately 180°. The suspension rod 24 is turned through a generally corresponding angle. Since the pantograph 39 holds the lifter plates from turning, this motion causes a relative rotation between the cam 43 and the cam follower 54 causing the cam slot 47 to move in the cam 43 and the attached lifter plate 20 axially of the suspension shaft 24 a predetermined distance. This distance is set by the shape of the cam slot 47 to provide a predetermined spacing change between the front two lifter plates 20 in a manner illustrated in dash-dot lines in FIG. 2. Simultaneously, the axial movement of the lifter plate 20 with cam 43 causes a corresponding axial movement of the rear lifter plate on suspension block 49. This also results in a rearward movement of the two rear lifter plates 20 under the control of the parallel links 53. The length and positioning of the links 53 is chosen so that the desired front to rear spacing change of the lifter plates 20 is obtained as the result of the predetermined spacing adjustment between the front two lifter plates 20. The final positions of all of the lifter plates 20 are set as described above so that the eggs supported by the plates 20 are in ten generally equally spaced rows with the spacing between the eggs in each row being suitable so that the released eggs 9 will enter the pockets 8 of the conveyor rollers 4 in the manner illustrated at the right hand side of FIG. 1 as described above. After the eggs have been released onto the conveyor 2, the lifter arms 12 swing back to their original position causing the egg lifter plates 20 to again resume their pick-up positions for the spaced egg trays 10 as illustrated at the bottom of FIG. 2.

It will be seen that an improved spacing means has been provided for an egg transfer device or a similar device. A pivotal transfer motion of a transfer plate drive mechanism is employed to obtain a smooth and precise adjustment of transfer plate spacing. The improved spacer means permits a smooth high speed transfer operation for fragile articles such as eggs. It is a relatively simple and rugged device and is particularly useful in food processing operations as it has a minimum number of exposed and readily sanitized operating members.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In an article transfer device for picking up and for carrying an array of articles from a pick-up position to an article placement position and including article supporting means and lifter members for moving the supporting means between said positions the improvement comprising:
   said supporting means comprising a plurality of rows of individual lifter plates with a plurality of lifter plates in each row;
   means for changing the spacing between individual lifter plates in each row during the movement of the supporting means between said positions; and
   means for simultaneously changing the spacing between said rows of lifter plates.

2. The article transfer device as claimed in claim 1 in which the means for changing the spacing between rows comprises coupling means between rows which is activated in response to a change in spacing between individual lifter plates within a row.

3. The article transfer device as claimed in claim 1 in which said lifter members comprise a pair of arms;
   a drive shaft coupled to one end of each of said arms for swinging the opposite end of said arms along an arcuate path;
   a suspension shaft rotatably mounted on said other ends of said arms and supporting said lifter plates; and
   means coupled to said suspension shaft for maintaining said lifter plates in a generally horizontal position.

4. The article transfer device as claimed in claim 3 in which said means for changing the spacing between lifter plates and between rows of lifter plates comprises a cam mounted on said suspension shaft;
   a cam follower coupling said cam to one of said lifter arms for moving said cam axially of said suspension shaft; and
   means operatively connecting said rows of lifter plates for changing the spacing between rows of lifter plates in response to axial movement of said cam.

5. The article transfer device as claimed in claim 4 in which said means for changing the spacing between individual lifter plates comprises coupling means for moving one or more lifter plates in a row of lifter plates responsive to axial movement of said cam; and
   said means for changing the spacing between rows comprises a link member coupling adjacent rows together and pivotally connected at its opposite ends to adjacent rows.

6. The article transfer device as claimed in claim 4 in which said cam comprises a cylindrical cam having a spiral shaped cam slot therein.

7. The article transfer device as claimed in claim 1 in which said lifter plates are adapted for transferring eggs and have a plurality of flexible egg cups mounted in rows on the bottom of each lifter plate and coupled to a source of vacuum.

8. The article transfer device as claimed in claim 1 in which said lifter plates have egg engaging vacuum cups on their lower surfaces arranged in rows, and said means for changing the spacing of plates and of rows of plates is adjusted for transferring eggs from a plurality of spaced egg trays to a plurality of equally spaced egg row supporting members on an egg conveyor.

9. In an egg transfer device for picking up and for carrying an array of eggs from a pick-up position to a placement position and including egg supporting means and pivotally mounted lifter members for moving the supporting means between said positions the improvement comprising;
   said egg supporting means comprising a plurality of rows of individual egg lifter plates with a plurality of egg lifter plates in each row;
   a suspension shaft rotatably mounted on said lifter members and supporting said rows of lifter plates;
   cam means for changing the spacing between individual lifter plates in the rows during the movement of the supporting means between said positions; and
   means coupling said rows together for changing the spacing between said rows of egg lifter plates responsive to a change in the spacing between two egg lifter plates in one row.

10. The article transfer device as claimed in claim 9 in which said cam means comprises a cam mounted on said suspension shaft; and
    a cam follower coupling said cam to one of said lifter members for moving said cam axially of said suspension shaft.

11. The article transfer device as claimed in claim 10 in which said cam comprises a cylindrical cam having a spiral shaped cam slot therein.

12. The article transfer device as claimed in claim 9 in which said lifter plates have egg engaging vacuum cups on their lower surfaces arranged in rows, and said means for changing the spacing of plates and of rows of plates is adjusted for transferring eggs from a plurality of spaced egg trays to a plurality of equally spaced egg row supporting members on an egg conveyor.

* * * * *